United States Patent
Ashcroft

(10) Patent No.: US 12,547,275 B2
(45) Date of Patent: *Feb. 10, 2026

(54) PROXIMITY DETECTION FOR TOUCH INPUT DEVICES

(71) Applicant: Apple Inc., Cupertino, CA (US)

(72) Inventor: Tavys Q. Ashcroft, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/937,714

(22) Filed: Nov. 5, 2024

(65) Prior Publication Data

US 2025/0060846 A1    Feb. 20, 2025

Related U.S. Application Data

(63) Continuation of application No. 18/449,551, filed on Aug. 14, 2023, now Pat. No. 12,175,038, which is a continuation of application No. 17/664,345, filed on May 20, 2022, now Pat. No. 11,762,500.

(51) Int. Cl.
| | |
|---|---|
| *G06F 3/04883* | (2022.01) |
| *G06F 3/041* | (2006.01) |
| *G06F 3/044* | (2006.01) |
| *G06F 3/04886* | (2022.01) |

(52) U.S. Cl.
CPC ........ *G06F 3/04166* (2019.05); *G06F 3/0444* (2019.05); *G06F 3/04883* (2013.01); *G06F 3/04886* (2013.01); *G06F 2203/04101* (2013.01); *G06F 2203/04107* (2013.01)

(58) Field of Classification Search
CPC ............... G06F 3/04166; G06F 3/0444; G06F 3/04883; G06F 3/04886; G06F 2203/04101; G06F 2203/04107
See application file for complete search history.

(56) References Cited

U.S. PATENT DOCUMENTS

| | | | |
|---|---|---|---|
| 11,762,500 B1 * | 9/2023 | Ashcroft | G06F 1/3262 345/156 |
| 12,175,038 B2 * | 12/2024 | Ashcroft | G06F 1/3287 |
| 2016/0357317 A1 | 12/2016 | Kim et al. | |
| 2017/0235370 A1 | 8/2017 | Chen et al. | |
| 2019/0265832 A1 | 8/2019 | Chan et al. | |
| 2023/0400945 A1 | 12/2023 | Ashcroft | |

* cited by examiner

*Primary Examiner* — Afroza Chowdhury
(74) *Attorney, Agent, or Firm* — Dorsey & Whitney LLP

(57) ABSTRACT

Sensors capable of detection of user objects within different detection zones can be used to reduce power consumption of a touch screen interface of an electronic device, even while the device is in a suspended or sleep state. At least one object sensor, such as a capacitive sensor, has a detection zone or range exceeding the range of a touch screen sensor, so the touch screen sensor can be placed into a low power state until the object sensor detects a user object in a position approaching the touch screen. The object sensor(s) are positioned around or within the perimeter of the interaction area of the touch screen. The object sensor(s) can have less power consumption than the touch screen sensors, so the electronic device can have extended standby battery life or other more energy efficient operation. Object sensors are also used to detect gestures or user object positioning.

20 Claims, 7 Drawing Sheets

PROXIMITY DETECTION FOR TOUCH INPUT DEVICES

CROSS-REFERENCE TO RELATED APPLICATION(S)

This is a continuation of U.S. patent application Ser. No. 18/449,551, filed 14 Aug. 2023, and entitled "Proximity Detection for Touch Input Devices," which is a continuation of U.S. patent application Ser. No. 17/664,345, filed 20 May 2022, and entitled "Proximity Detection for Touch Input Devices," which issued as U.S. Pat. No. 11,762,500 on 19 Sep. 2023, and the entire disclosures of which are hereby incorporated by reference.

FIELD

The described embodiments relate generally to apparatus, methods, and systems for controlling a touch input device. More particularly, the present embodiments relate to detecting objects at a distance away from a touch input device that is greater than a distance at which the touch input device can detect the objects.

BACKGROUND

With the development of mobile communication technologies, electronic devices, which are often equipped with a display, such as smartphones, wearable devices, tablet computers, laptop or notebook computers, vehicle interfaces, and the like have been widely normalized and integrated into everyday life of millions of users.

A display of the electronic device may be a touch screen interface. The touchscreen display may perform a role as an input device that receives a manipulation from a user, in addition to a role as a display device. Touchscreen displays are commonly implemented with capacitance sensing capability, wherein arrays of electrodes at or below a cover glass material are used to sense a change in capacitance caused by introduction of a user instrument (e.g., a finger or tool) to the surface of the cover glass.

Although touchscreens provide an engaging interface for users, they can also have undesirable energy consumption, especially for portable devices that have limited battery energy storage devices. Touchscreens are also generally short-range sensors, so distant objects are not effectively detectable. Accordingly, there is a constant need for improvements to touch screen display technology.

SUMMARY

One aspect of the disclosure relates to a computing device, comprising: a first sensor capable of detection of a user within a first detection zone; a second sensor capable of detection of the user within a second detection zone, with the second detection zone being smaller than the first detection zone; a processor; and a non-transitory computer-readable memory device in electronic communication with the processor and storing computer-executable instructions that, when executed by the processor, cause the processor to: detect the user within the first detection zone; and increase a responsiveness characteristic of the second sensor in response to detecting the user within the first detection zone, wherein the second sensor is enabled to detect the user within the second detection zone.

In some embodiments, the second sensor includes a capacitance sensor positioned within a capacitive touch screen interface. The capacitive touch screen interface can include a perimeter around which the first sensor extends. The capacitive touch screen interface can include an elongated dimension and a relatively reduced dimension perpendicular to the elongated dimension, wherein the first sensor extends parallel to the elongated dimension.

Detecting the user within the first detection zone can comprise detecting the user within a portion of the first detection zone external to the second detection zone. Increasing the responsiveness characteristic can comprise increasing a scan rate of the second sensor. The instructions can further cause the processor to: detect that the user is not within the first detection zone; and decrease the responsiveness characteristic of the second sensor in response to detecting that the user is not within the first detection zone.

Another aspect of the disclosure relates to an electronic device, comprising: a first capacitive sensor system that, when active, has a first power consumption rate; a touch interface device including a second capacitive sensor system that, when active, has a second power consumption rate, with the second power consumption rate being greater than the first power consumption rate; and a control device in electrical communication with the first and second capacitive sensor systems and configured to execute electronic instructions, wherein: in a first state, the first capacitive sensor system is enabled by the control device to sense an object at the first power consumption rate while the second capacitive sensor system is prevented by the control device from sensing the object at the second power consumption rate; and in a second state, at least the second capacitive sensor system is enabled to sense the object at the second power consumption rate.

In some embodiments, the first capacitive sensor system has a longer object sensing range than the second capacitive sensor system. The second capacitive sensor system can have a lower scan rate in the first state than when the second capacitive sensor system is in the second state. The control device can be configured to transition the second capacitive sensor system from the first state to the second in response to sensing the object with the first capacitive sensor system. The first capacitive sensor system can be positioned within a perimeter of the touch interface device. The first capacitive sensor system can be positioned external to a side surface of the touch interface device. The first capacitive sensor system can include a drivable conductive shield and a drivable conductive electrode positioned external to the drivable conductive shield, wherein the first capacitive sensor system has an extended sensor range on an external side of the drivable conductive electrode.

In yet another aspect of the disclosure, a computing device is provided which comprises: a housing; a touch-sensitive display interface positioned within the housing and having an outer perimeter; a capacitive sensor extending along at least two opposite sides of the outer perimeter; and a touch controller in electronic communication with the touch-sensitive display interface and with the capacitive sensor. The capacitive sensor can be controllable to sense a user while the touch-sensitive display interface is disabled, and the touch-sensitive display interface can be enabled to sense the user in response to the capacitive sensor sensing the user.

In some embodiments, the capacitive sensor entirely surrounds the outer perimeter. In some embodiments, the capacitive sensor includes a first capacitive sensor extending parallel to one of the two opposite sides and a second capacitive sensor extending parallel to another one of the two opposite sides. In some embodiments, the capacitive sensor is positioned within the outer perimeter. In some embodiments, the capacitive sensor includes a first capacitive sensor and a second capacitive sensor, with the first capacitive sensor and the second capacitive sensor each having a user-sensing range extending at least halfway across a width dimension of the touch-sensitive display interface. The capacitive sensor can comprise a driven electrode positioned on a substrate external to a driven shield, wherein the driven shield is positioned on the substrate opposite the driven electrode.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
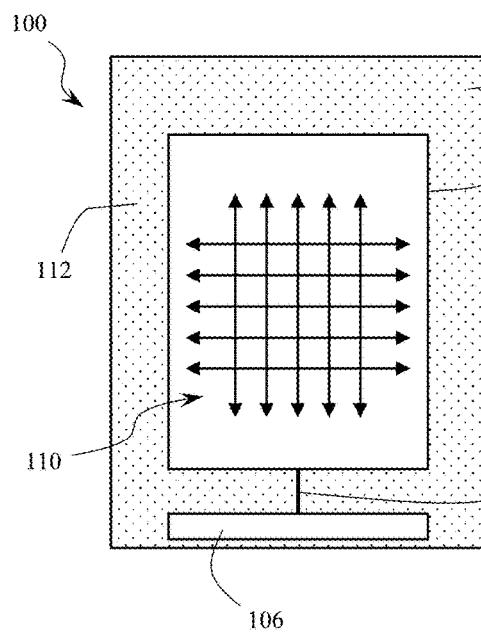
FIG. 1 shows a front view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Although capacitive touchscreen devices provide an engaging and effective interface for human-to-device interaction, managing their power consumption can be challenging. While the touchscreen device is active, its backlight, liquid crystal display (LCD), and touch sensor consume considerable energy from the limited store of onboard energy storage. In order to conserve energy and extend battery life, the touchscreen device can be configured to enter a "sleep," suspended, standby, or low-power state in which at least the backlight and LCD are disabled. In this state, the electronic device can have computing and sensor components that remain active while the backlight and LCD are disabled so that the touchscreen device can be reactivated in response to detecting human interaction with the electronic device. For example, the screen can be dark while the touchscreen device is sitting flat on a table, but the screen can be reactivated when the device is raised and rotated to a viewing position or when a sleep/wake function button is pressed.

In some cases, the touchscreen device is not deactivated completely while in a standby condition, and its touch-sensitive sensors (e.g., its layered capacitive sensor array in a touch screen display interface) can remain active and available for detecting a touch on the screen even though it visually appears dark because the backlight and LCD are turned off. In this state, the touchscreen device can be referred to as being in a "tap to wake" standby state, wherein a user can tap on the touchscreen to cause the backlight and LCD array to turn on in response to the user's touch being detected by the still-active touch sensor.

In order to conserve power and to extend standby battery life of the electronic device, the scan rate of the touchscreen device is reduced while in the standby mode as compared to when the backlight and LCD are active and the user is actively interacting with the touchscreen. However, the power requirements to keep the touchscreen device capable of receiving touch input, even while in the tap-to-wake standby mode, undesirably limit the standby battery life of the electronic device. In some embodiments, the scan rate of the touchscreen device cannot be too low (i.e., too slow) or else the touchscreen sensor may not be responsive enough to detect the touch and react to "wake" the device when the user taps on the screen. The scan rate of the touchscreen sensor also cannot be too high or else the sensor wastes energy scanning for touches unnecessarily frequently while merely waiting for the input to be provided.

Aspects of the present disclosure relate to systems, apparatuses, and methods including at least one object sensor positioned in or on the electronic device that can be used to detect a user object at a longer range than the touch screen display interface and by using less power than the touch screen device. In some embodiments, the object sensor can be used to affect the touch scanning behavior of the touchscreen device, such as by transitioning the sensor components of the touchscreen device from a deactivated state (i.e., a very low or unpowered state in which the sensor cannot detect a user object such as a body part, stylus, other user instrument, or combinations thereof) to the "tap-to-wake" standby state (i.e., a low power state that has higher consumption than the deactivated state and that can detect the user object).

In some embodiments, a capacitive sensor can be positioned on the electronic device that has low power consumption but that can detect the presence of a user or user instrument. When it detects the user or other object, the signal from the low power sensor can be used to unlock or enable higher power, higher resolution capacitive sensors of the touchscreen, whether by transitioning from the disabled state to a standby, low-scan-rate state (e.g., a "tap-to-wake" state) or from a disabled state to an active, high-scan-rate state with the backlight and LCD active as well.

For instance, aspects of the present disclosure relate to methods of conserving power or improving the responsiveness of a low power/suspended/sleep-configured touchscreen by using a low power sensor to activate a higher consumption/more responsive mode of the touchscreen while the screen has the appearance of being deactivated, i.e., in the "tap-to-wake" standby mode, in both modes. Then, when the user interacts directly with the touchscreen in its standby mode, the touchscreen or other device components can be fully activated (e.g., a backlight and LCD matrix). Thus, the amount of time that the touchscreen remains in its higher-consumption standby mode can be minimized relative to the time it is in a fully disabled mode, and the external or additional sensor can be used predominantly to detect an incoming user while the device is in its disabled mode. This multi-stage "waking" procedure can measurably reduce the power consumption of the device while it is in standby mode since the touchscreen sensors can remain completely disabled for large amounts of time (i.e., during extended times between user interactions or while the device is stored or otherwise away from the user).

Furthermore, in some embodiments, the signals from the additional object sensor can be used to detect the approach of a user object better than the touchscreen due to the additional sensor having longer effective user detection range than the touchscreen sensor. Therefore, the electronic device does not need to have a scan rate sufficient to detect the user's contact at the instant he or she comes into contact with the touchscreen. Instead, the user's incoming movement can be detected by the longer-range object sensor, and the touchscreen can be controlled in a manner that anticipates that the user object's contact with the device is imminent. In this manner, the additional sensor's signal can be treated as an advance warning or alert to the system to prepare itself for incoming user interaction, such as by increasing the scan rate of the touchscreen, activating the backlight or other display features, etc.

Additionally, the longer-range object sensor can be used to detect movement of the user object away from there touchscreen at a distance, thereby allowing the electronic device to transition to a state where the display interface either returns to the standby or disabled mode or otherwise reduces power consumption in response to a determination that the user will not be providing imminent input. In this way, the electronic device can conserve energy (e.g., by reducing or disabling touch screen scanning) while it is active and powering the backlight and LCD, or it can conserve energy by returning to sleep mode until a user is detected again and it needs to return to a higher scan rate or another higher consumption rate.

Longer-range object sensors can also be used as part of methods and systems for detecting a hovering or gesturing user object, such as by detecting a user object's presence or absence at a distance from the device that is beyond the detection range of the display interface, detecting a position of the user object relative to the object sensors (e.g., detecting a delta in sensor readings from multiple longer-range sensors), and reducing false positives of user object detection by filtering certain sensor readings from the longer range sensors or touchscreen.

The dedicated, longer range, lower-consumption sensors can comprise one or more devices positioned in or on the electronic device in a manner configured to detect the user's presence before the user contacts the touchscreen. The shape of the long range object sensor can include a ring-shaped, annular, or rectangular/square circuit including at least one electrode configured for capacitance sensing that extends around all (or substantially all) of the perimeter of the touchscreen's input-receiving interface area. See, e.g., FIGS. 2-3. In some cases, four separate edge sensors can be used, wherein they respectively extend along substantially the entire length dimensions and width dimensions of the perimeter of a rectangular touchscreen. See, e.g., FIG. 4. In other cases, two sensors can be positioned along opposite edges of the touchscreen, such as by extending parallel to elongated edges of a rectangular perimeter on opposite sides or along two shorter sides of the rectangular perimeter of the touchscreen. See FIGS. 5-7.

In embodiments where multiple sensors are used, each sensor can define a respective zone of detection (i.e., a detection range for sensing a user object with sufficient confidence to filter out noise and instrument error) spaced apart from each other, thereby expanding the effective detection area of the object sensors as a whole and optimizing their power consumption/detection zone sizes. Comparatively, embodiments with a single sensor may need to draw higher power than multiple smaller or lower-powered sensors in order to be capable of sensing the entire area around the electronic device in a similar manner, or the range of the single sensor may be inordinately large for the sensing task. Nevertheless, in some embodiments, a single object sensor can be used that extends around the perimeter of the display interface or a single object sensor can be used that is positioned around less than the entire perimeter (e.g., positioned on just one side of a rectangular perimeter), and the sensor can have a detection range extending across the entire interactive area of the display interface.

Generally, the object sensor (or the set of multiple object sensors) can be configured to have an overall/collective detection range that extends across the entire width and length of the anticipated touch screen input surface. When multiple object sensors are used, they can each cover portions of the entire touchscreen input surface so that, collectively, they provide complete coverage and can detect the user's approach toward the touchscreen input surface from any direction. When two object sensors are used and positioned on opposite sides of the touchscreen, their sensing ranges can each extend at least halfway across the width of the touchscreen area separating them from each other. In some embodiments, their sensing ranges can at least partially overlap in order to ensure consistent detection coverage. See FIG. 11.

The object sensors can be located externally relative to the perimeter of the touchscreen interactive area, such as by being positioned within a border or bezel area surrounding the touchscreen of the electronic device. See FIGS. 8-9. For instance, the sensor can be integrated within or adjacent to adhesive that extends around the border or perimeter of a cover glass panel that protects the touchscreen and that is attached to a housing of the electronic device. In some configurations, the object sensors can be located internally relative to the perimeter of the touchscreen interactive area, such as by being positioned near, but within, the borders of the perimeter. See FIG. 10. In this case, the sensor can be integrated with components and layers of the touch screen and its related capacitive sensor. In other words, a long range capacitive sensor can be part of the touchscreen itself and can be positioned amongst or immediately adjacent to the lower-range capacitive sensors in the array of sensors used for general interaction with the touchscreen.

In various embodiments, the object sensors can comprise capacitive sensors such as sensors comprising driven electrode components and driven shield components in a "sandwiched" configuration. See FIGS. 8-10. The sensors can be sensitive to changes in an electric field near the sensors, such as changes caused by introduction of a user object such as a user's body part (e.g., finger, hand, or palm), an electronic tool (e.g., a stylus), or other object to be tracked by the object sensor or touchscreen device. In some embodiments, object sensors can comprise infrared sensors (e.g., a passive infrared (PIR) sensor or motion sensor), cameras, radar devices, lasers, or other distance or proximity sensor devices. Electronic instructions, executed by a processing/computing device, can be configured to interpret signals from these sensors to detect, at a distance greater than the detection distance of the touchscreen sensor, a user object. The electronic device can then take a responsive action, such as by activating/deactivating the touchscreen sensor, changing an operational state (e.g., scan rate) of the touchscreen, or taking action with other interface devices of the electronic device, as explained elsewhere herein.

These and other embodiments are discussed below with reference to the figures. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 schematically illustrates an electronic device 100 having a housing 102, a touch-sensitive display interface 104 positioned within the housing, a control device 106 in electronic communication with the display interface 104 via a display connection 108. The electronic device 100 can comprise a computing device such as a tablet computer, smartphone, smart watch, touch screen kiosk, desktop computer, notebook/laptop computer, a related device, and combinations thereof. The electronic device 100 is shown as a tablet computing device. In some embodiments, the electronic device 100 can comprise other types of computer interfaces, such as, for example, touch screens positioned in a housing to be used as a touchpad or trackpad, a personal computer such as a laptop or computing notebook, an e-reader, a smartphone, a smart watch, a kiosk or other standing interface, an electronic pen digitizer, related devices, and combinations thereof. The electronic device 100 can comprise electronic computer components in electronic communication with each other, such as, for example, the computer system 1400 discussed in connection with FIG. 14.

The housing 102 can include a rigid base structure used to hold, protect, and support other components of the electronic device 100. The housing 102 can include an electrically conductive material such as metal to act as a reference ground for the electronic device 100. The housing 102 can be configured to be held by the user, a stand, or other support (e.g., a desk) while the device 100 is operated. User input provided by a user instrument to the display interface 104 can vary based on whether the user is holding the housing 102, whether the housing 102 is mounted to a support, and whether a case or cover is positioned on the sides or back of the housing 102 due to change in the electrostatic charge of the user object and the device 100 when the input is provided.

The housing 102 can include a bezel 112 that extends around a perimeter of the display interface 104. The bezel 112 can surround the display interface 104 and can be positioned between the outer lateral edge of the display interface 104 and the outer lateral edge of the housing 102 in general. In some embodiments, the front facing surface of the housing 102 can include a cover glass or other transparent sheet overlaid on the display interface 104 and bezel 112 that can cover and protect the front facing side of the housing 102. The control device 106 is shown within a portion of the bezel 112 in FIG. 1, but, in various embodiments, the control device 106 can be positioned in other portions of the housing 102, such as, for example, at least partially layered underneath the display interface 104.

The bezel 112 can comprise a portion of the device 100 near the display interface 104 where output (e.g., backlight of a liquid crystal display (LCD)) is not provided. See also bezel portion 806 in FIG. 8 and its related description below. The bezel 112 can have a width dimension extending from a side edge limit of the display interface 104 to an outer edge or rim of the front face of the device 100 (e.g., an outer edge of the housing 102 or a cover glass/cover panel/cover layer). In some embodiments, a single cover glass sheet or other transparent panel can cover the display interface 104 and the bezel 112, with the display interface 104 being viewable through the transparent panel. In some embodiments, a separate cover or housing component can be used over the display interface 104 as compared to the bezel 112. As discussed in further detail below, object sensors can be positioned in the bezel 112 at various positions around the display interface 104. See FIGS. 2-11. The object sensors can comprise various user detection devices, such as, for example, at least one camera, ambient light sensors, capacitive sensors, lasers, active infrared reflective and time-of-flight sensors, passive infrared motion sensors, and similar devices used to detect a user at a distance greater than the effective user sensing range of the display interface 104.

The display interface 104 can comprise a touch sensitive interface and display assembly. The display interface 104 can therefore configured to since the presence of a user object that comes into the proximity of the front major surface of the display interface 104, such as by contacting portions of the touch sensors (e.g., contacting electrode layers of a capacitive touch sensitive interface or contacting an outer layer of a conductive touch sensitive interface) or by contacting or being positioned in close proximity to the front or outer surface of a cover glass or similar cover layer. The display interface 104 can be operable as a touch input device, such as a capacitive touch screen display configured to sense a change in capacitance or voltage drop at one or more areas of its outer surface caused, for example, by the presence of a user object or other instrument (e.g., a hand, finger, tool, stylus, glove, or similar instrument) which has an electric charge or electric field detectable by the electrodes/conductors of the display interface 104.

The display interface 104 can comprise an electrostatic arrangement or array of conductive electrodes 110, such as a set of surface capacitive sensors and projective capacitive sensor traces, and can thereby detect the proximity and position of the user instrument relative to the outer surface of the display interface 104. In an example embodiment, the display interface 104 can include a transparent outer structure (e.g., a cover glass), transparent conductive layers separated by an insulating layer or separator below the outer structure, and a graphical display component (e.g., LCD or e-ink display and backlight) configured to generate images and to provide backlighting for the images generated in a manner visible through the transparent conductive layers. See also FIGS. 8-10 and their descriptions herein. The transparent conductive layers can each comprise a set of parallel conductive traces, with one layer having traces oriented perpendicular to traces on another level. As a result, the position and magnitude of one or more voltage drops at one or more positions in multiple layers can be detected and tracked by the touch screen controller, which may be part of the control device 106. Thus, the display interface 104 can be a multi-touch device configured to sense multiple touches, gestures, tool inputs, and similar inputs to receive input for the electronic device 100. In some embodiments, the display interface 104 can be a display described in U.S. patent application Ser. No. 17/653,439, filed 3 Mar. 2022 and entitled "Cover Layer Detection for Touch Input Devices," which is hereby incorporated by reference in its entirety.

In embodiments where the touch sensitive interface of the display interface 104 is capacitance-sensing, the display interface 104 can include multiple layers of electrodes 110 arranged in perpendicular arrays. FIG. 1 shows how one layer of the electrodes can extend parallel to each other in one direction and the second layer of electrodes can extend parallel to each other in a second direction that is perpendicular to the first direction. The two layers of electrodes can be separated from each other by an insulating layer or separator. See also FIGS. 8-10 and their descriptions herein.

The touch sensor electrodes can be transparent so as to not significantly interfere with visibility of the display components that are positioned underneath them. In order for the electrodes to be transparent, they can often be made very small, such as being small enough that the naked eye cannot perceive their locations in the display interface 104. Additionally, their sensing range can be limited to a short distance away from the surface of the electronic device 100, such as, for example, a distance of two millimeters or less. A voltage drop can be sensed when a user object is positioned near an intersection between an electrode in an upper layer and an electrode in a lower layer due to the change in the electric field at (and penetrating into) the surface of the electronic device 100. This voltage drop can be measured at various points and with various degrees of intensity by various intersecting pairs of electrodes in the touch sensor layers so that a position of the user's object(s) relative to the display interface 104 can be estimated and calculated. The sensor information can be provided via the display connection 108 to the control device 106 to make that calculation and to take responsive action using other components of the electronic device 100, such as, for example, the display portion of the display interface 104, output from speakers, haptic output, output from other output devices, etc.

The display interface 104 can include a display screen assembly layered under (or over) the touch sensor layers and can include display components such as, for example, a backlight (e.g., including light emitting diodes (LEDs) and related light-guiding/diffusion components) and an LCD matrix or including organic light emitting diode (OLED) matrix for displaying information. The display connection 108 is schematically shown as a single connection between the display interface 104 and the control device 106 in the figures, but the display connection 108 can be used to send and receive multiple signals, including multiple signals simultaneously and in parallel, between the display interface 104 (including its touch sensors (e.g., 830 and output display screen features) and the control device 106 (and its constituent components).

Figure 2:
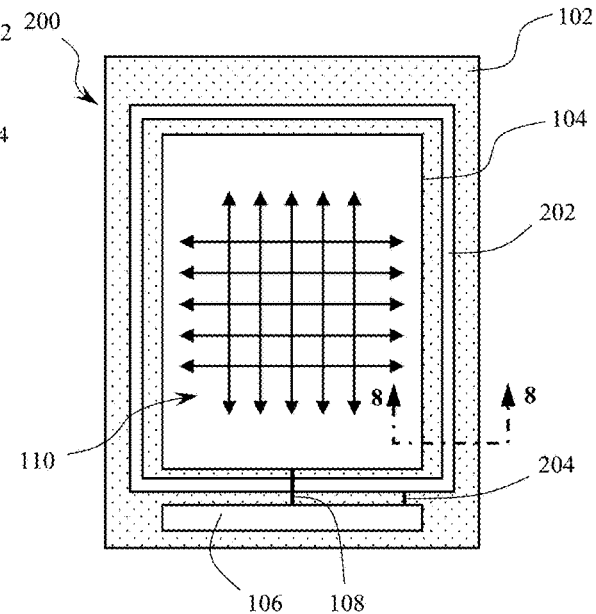
FIG. 2 shows a front view of an electronic device having an object sensor.

FIG. 2 shows an embodiment of an electronic device 200 having several features in common with electronic device 100 and which are shown using the same numeric indicators. Electronic device 200 can include an object sensor 202, e.g., a capacitive sensor system, that is positioned in the housing 102 in addition to the display interface 104 and that has a separate sensor connection 204 to the control device 106. The object sensor 202 can be at least partially positioned in the bezel 112 and can be positioned laterally external to the perimeter of the display interface 104 in multiple directions. As described in further detail below, the object sensor 202 can be positioned in or integrated with a seal or adhesive component that holds the cover glass or other cover layer of the electronic device 200 to the remainder of the housing 102. The size and positioning of the object sensor 202 can ensure sure that it is capable of sensing a user object approaching the display interface 104 from any direction, including from all four lateral directions (i.e., from all four primary directions across the plane of the page on which FIG. 2 is shown and parallel to the front surface/surface touched by the user when providing input to the display interface 104), from a direction perpendicular to the cover layer, such as from a direction perpendicular to the electrodes 110 and extending into the plane of the page through the cover layer over the display interface 104, or in combinations thereof.

The object sensor 202 can be a capacitive sensor having at least two conductive components spaced apart (e.g., vertically spaced apart) by an insulator layer. Thus, the object sensor 202 can be a capacitive sensor having at least two conductive electrodes spaced apart by an insulating substrate (e.g., a flexible circuit board or printed circuit board (PCB), such as a polyimide substrate). When a user object is positioned in the proximity of the object sensor 202, an electric field output by the user object can influence the capacitance value monitored and measured between the layered conductive electrodes of the object sensor 202. In this way, the electrodes can be used to sense the presence of a user object relative to the electronic device 200 before the user object comes into contact with the display interface 104 or cover glass of the housing 102. See also FIG. 8. As a result, the control device 106 can adjust the status or configuration of the display interface 104 to be more responsive or to transition from a low energy consumption mode without the user object first having to come into contact with the display interface 104, as described in further detail elsewhere herein.

Figure 3:
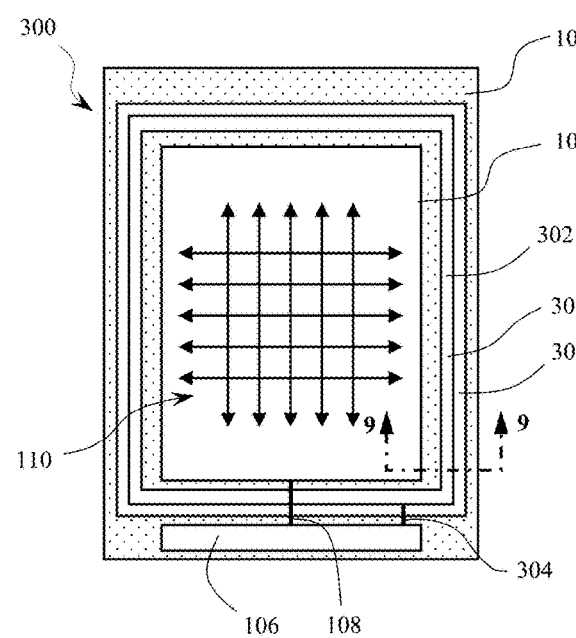
FIG. 3 shows a front view of an electronic device having an alternative object sensor.

FIG. 3 shows another embodiment of an electronic device 300 having components in common with electronic devices 100 and 200. In electronic device 300, the object sensor 302 is configured extending around the perimeter of the display interface 104. Object sensor 302 can have its own dedicated connection 304 to the control device 106 that is separate from the connection 108 of the display interface 104. Object sensor 302 can include a first portion 306 and a second portion 308 that are coupled to each other or that share a common base structure. In some embodiments, the portions 306, 308 are portions of a single substrate structure that bears, in one portion, capacitance sensing electrodes and, in the other portion, bears adhesive or other attachment structures to join the object sensor 302 to the housing 102 and/or to join the cover glass or other cover layer to the rest of the enclosure of the housing 102. The radially inner portion 306 can bear the electrodes and the radially outer portion 308 can bear the attachment structure, or vice versa. Thus, for electronic device 300, the electrodes and the attachment structure of the object sensor 302 can be laterally offset and spaced apart from each other on a substrate structure. Furthermore, a lateral gap can be located between the object sensor 302 (or 202) and display interface 104. See also FIG. 9.

Figure 4:
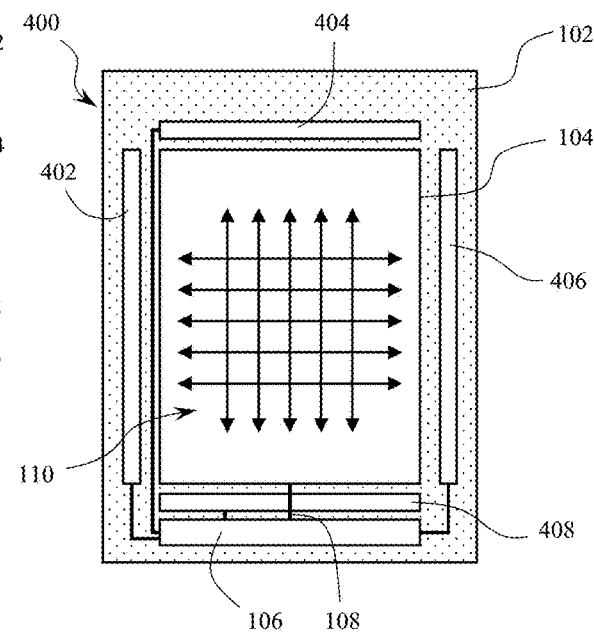
FIG. 4 shows a front view of an electronic device having a set of object sensors.

FIG. 4 illustrates an electronic device 400 with similar structures to electronic devices 100, 200, and 300. In this embodiment, a user object can be sensed using multiple object sensor components spaced around the perimeter of the display interface 104, as shown by object sensors 402, 404, 406, and 408. Each of these object sensors can have their own dedicated connection back to the control device 106, as shown in FIG. 4, thereby allowing their sensor signals to each be monitored and measured separately by the control device 106. Furthermore, each of these separate object sensors can be capacitance-sensing devices with layered electrode components similar to the electrodes described in connection with FIGS. 2 and 8-9. However, as compared with object sensor 202, the separate sensors 402, 404, 406, and 408 can each provide a different and independent sensor simultaneously readable by the control device 106, whereas object sensor 202 provides a single sensor reading to the control device 106. The separate sensor readings and signals coming from the discrete object sensors of electronic device 400 can allow the control device 106 to use the object sensors to detect movements and positions of a user object that would not be possible using object sensor 202. See also FIG. 13 and its related descriptions.

Figure 5:
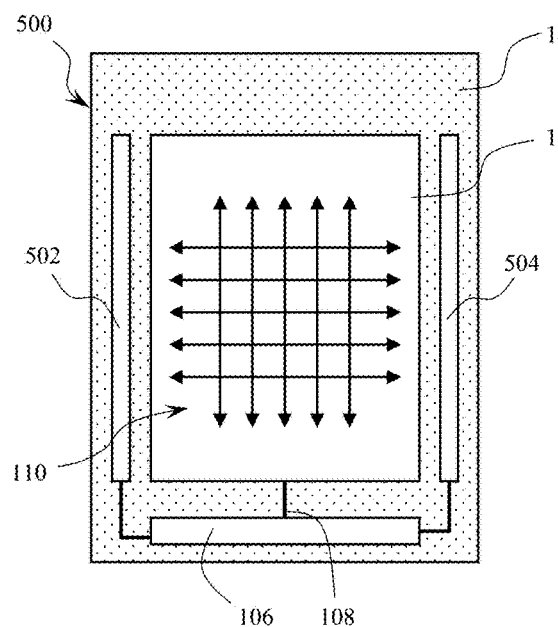
FIG. 5 shows a front view of an electronic device having an alternative set of object sensors.
Figure 6:
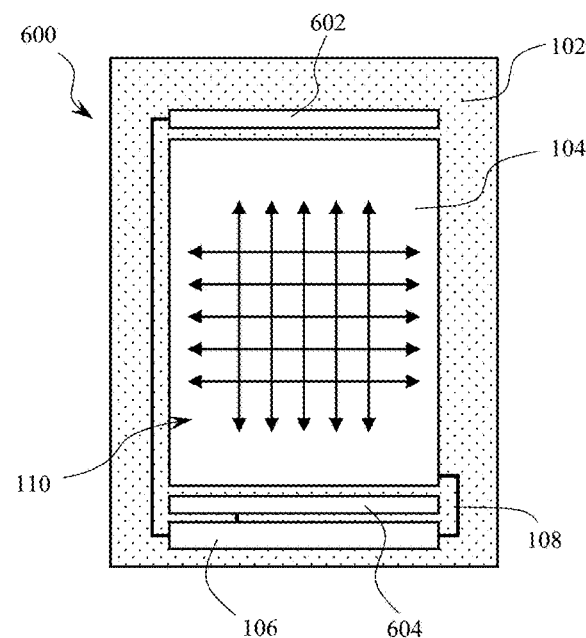
FIG. 6 shows a front view of an electronic device having another alternative set of object sensors.

FIGS. 5 and 6 show electronic devices 500, 600 having components in common with electronic devices 100, 200, 300, and 400. In electronic device 500, the object sensor includes two separate capacitance sensing devices 502, 504 positioned adjacent and parallel to opposite elongated edges of the display interface 104. In electronic device 600, the object sensor includes two separate capacitance sensing devices 602, 604 positioned along the lateral exterior of, and parallel to, opposing relatively short sides of the display interface 104 perimeter. These pairs of sensing devices 502, 504 and 602, 604 can be used to detect the presence or movement of an object sensor, as described in further detail in connection with FIGS. 12-13. Using smaller object sensor components (relative to object sensor 202 or 302) can simplify and reduce costs in manufacturing by reducing the part sizes from a large flexible ring-like component to smaller, more easily positionable individual object sensors (e.g., 502, 504). Furthermore, minimizing the size and shape of the object sensors can reduce costs when a large, entire-perimeter object sensor is not necessary. By extending parallel to the elongated length dimension of the display interface 104, object sensors 502, 504 can have their detection ranges minimized since the space between them is the shorter width of the display interface 104 as compared to object sensors 602, 604. By extending parallel to the shorter width dimension of the display interface 104, object sensors 602, 604 can have their sizes minimized since their lengths only extend along the shorter width as compared to object sensors 502, 504.

Figure 7:
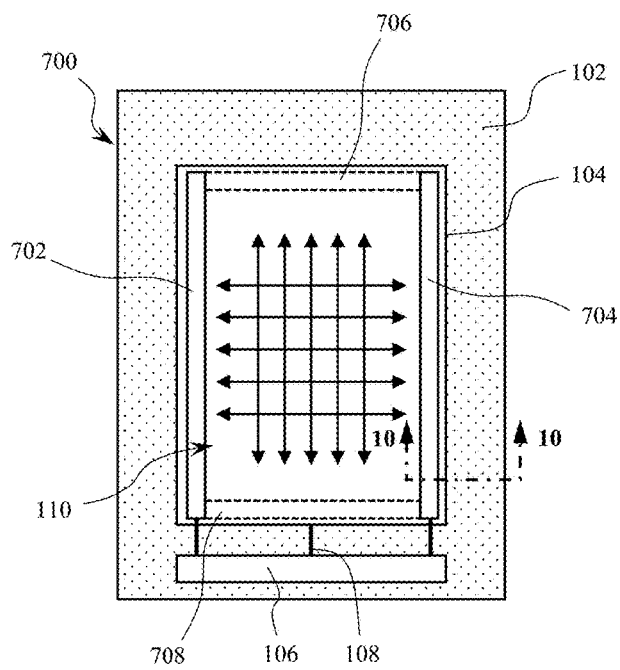
FIG. 7 shows a front view of an electronic device having yet another alternative set of object sensors.

FIG. 7 shows an electronic device 700 having some components in common with all of the other previous electronic devices of FIGS. 1 through 6, as shown using identical numerical indicators. FIG. 7 is similar to FIG. 5 by showing two object sensors 702, 704 positioned along and parallel to elongated sides of the display interface 104. However, the object sensors 702, 704 of electronic device 700 are positioned within (i.e., radially internal to and surrounded by) the perimeter of the display interface 104 when viewed through the front surface of the device 700 rather than being external to the perimeter (as in sensors 502, 504). The object sensors 702, 704 can be layered above or below the touch interface of the display interface 104 or can be integrated with and part of the touch sensor components of the display interface 104. See also FIG. 10 and its related descriptions.

FIG. 7 also shows, in broken lines, an alternative embodiment wherein the object sensors 702, 704 are linked to each other by one or more additional object sensors or object sensor segments 706, 708 to form a closed-shaped object sensor or partially closed-shaped object sensor (e.g., a U-shaped sensor) bounded within the perimeter of the display interface 104 when viewed through the front of the housing 102 (i.e., as shown in FIG. 7). The object sensors 702, 704, 706, and/or 708 can each have their own connection to the control device 106. In some cases, such as when they are all part of a single integral object sensor component, they can share a single connection back to the control device 106 or the assembly of sensors 702, 704, 706, and/or 708 can operate as a single unit (e.g., similar to object sensor 202).

The object sensors described in connection with FIGS. 2-7 can be referred to as parts of a capacitive sensor system, a long-range sensor system, a low-power sensor system, or an object detection system. The object sensors can have an effective user detection range larger than the display interface 104 and can therefore be referred to as having a greater sensing range or as defining a larger user detection zone than the display interface 104. In some embodiments, the user sensing range or user detection zone collectively defined by all of the object sensors can cover the entire display interface 104. See also FIG. 11 and its related descriptions herein.

The electronic devices of FIGS. 2-7 can be computing devices, wherein their housings 102 contain a first capacitive touch input device and a second capacitive touch input device. The first device can be a primary input device for the computing device (e.g., display interface 104), and the second device (e.g., object sensor 202, 302, 402, etc.) can be a secondary or auxiliary input device. Both input devices can be electronically connected to a controller (e.g., control device 106, including a processor and electronic memory device, touch controller, or similar device), thereby allowing their signals to be differentiated from each other by the controller. These and other computer components and connections are described in additional detail in connection with FIG. 14. An air gap or other insulator can be positioned between the input devices to electrically isolate them from each other, thereby reducing or eliminating a change of capacitance in one input device (e.g., 104) caused by a user's interaction with the other device (e.g., 202). Alternatively, a gap or electrical insulator can be omitted, and the secondary device can include a portion of the main input device.

In some circumstances, multiple object sensors (e.g., 502, 504) can be used to eliminate false positives or negatives of user object detection. For example, due to fluctuating influence of the user input (e.g., from different users, different user instruments, etc.) and environmental factors, user object sensor readings (e.g., influenced by the electric field of the user object) can have noise, sensor error, etc. By using two separate capacitive input devices, the influence of the user object's input can be compared on each sensor 502, 504 to confirm whether variation in one object sensor's measurement is error or confirmed by the other object sensor. In an example embodiment, a process can be implemented wherein a first object sensor and a second object sensor (e.g., 502, 504) each provide a signal to a control device (e.g., 106). The control device can compare the signals to determine if both signals indicate that a user object is within their respective detection ranges. If only one signal indicates the user object is present or if the signal is not distinguishable from noise or background signal variation, the control device 106 can take action as if the user object is not present, such as by ignoring that signal until both signals indicate that the user object is present. Accordingly, fluctuations in the sensed capacitance signals generated by one object sensor can more reliably be used to detect whether a user is positioned near the electronic device when compared to the signals from the other object sensor.

In some embodiments, any of the object sensors can be formed as a smaller "patch" or reduced-size region relative to the display interface 104. These smaller object sensors can be arranged in a bezel or similar area of the computing device and can extend along less than an entire length of the nearby side of the display interface 104. Thus, these object sensors can be smaller and more compact. Additionally, they can be sized and positioned on the computing device so as to be in positions anticipated to be where a user object will approach the electronic device, such as on the left, right, or bottom ends of the front face in cases where the user is unlikely to approach from the top end. Thus, the positioning and size of the object sensors of FIGS. 2-7 can be optimized based on anticipated electronic device use cases. Additionally, object sensor positioning can be beneficially configured to be placed away from the corners of the housing 102 so as to permit the housing to be structurally reinforced in those areas rather than having to make space for the object sensors. Object sensors need not necessarily extend across the entire width or length of the display interface 104 as well, and can extend partially along any side of the display interface 104. In some cases, the detection range of a shorter object sensor can still be sufficient to sense a user object passing by an end portion of the object sensor even if the user object does not pass over (i.e., the object's path does not overlap or cross) the object sensor.

Figure 8:
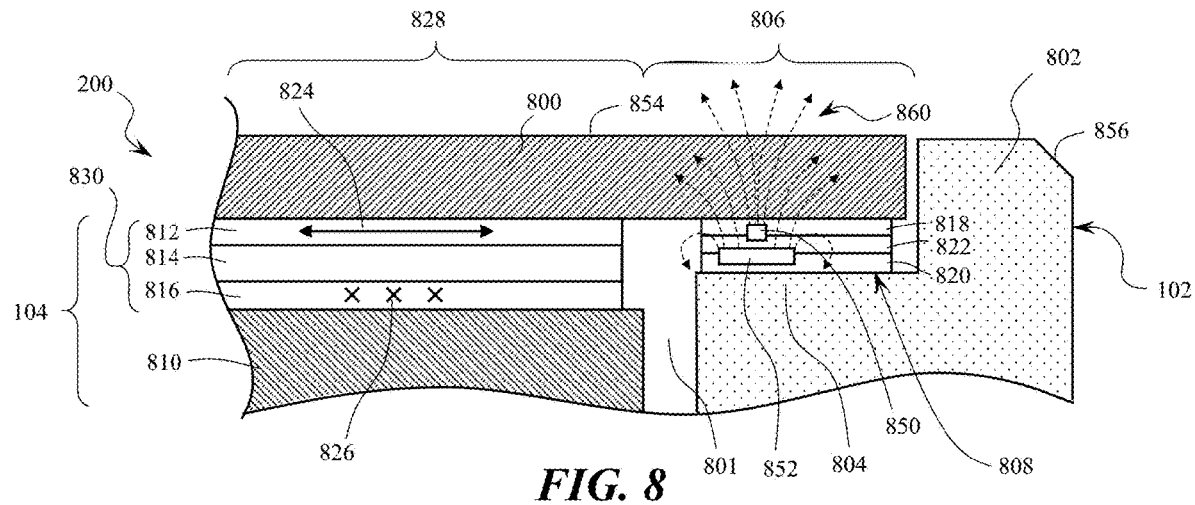
FIG. 8 shows a side section view as taken through section lines 8-8 in FIG. 2.

FIG. 8 illustrates an example cross-section of an electronic device 200 as taken through section lines 8-8 in FIG. 2. Features and principles illustrated in connection with device 200 can be implemented in any of the other electronic devices described herein. This view shows how components can be positioned in the assemblies of the display interface 104 and housing 102. The housing 102 of the electronic device 200 can include an inner cavity 801 and a cover layer 800 (e.g., a transparent cover or cover glass layer) mounted to an outer enclosure 802 at a shelf 804 or bezel support portion of the outer enclosure 802. The shelf 804 (i.e., the cover support portion of the outer enclosure 802) can be located in a bezel portion 806 of the housing 102 and under a radially outer end of the cover layer 800. An attachment structure 808 can couple and hold the cover layer 800 to the outer enclosure 802 at the shelf 804.

The display interface 104 can include a display assembly 810 positioned in the cavity 801 and which can be covered by a first touch trace layer 812, an insulator layer 814, a second touch trace layer 816. The display assembly 810 can include the output display (e.g., LCD and backlight or OLED panel). The cover layer 800 can comprise glass, polymer, or another transparent or translucent material. An attachment structure 808 can be used to attach the cover layer 800 to the outer enclosure 802 and to seal any gaps between the surface of the cover layer 800 and the outer enclosure 802 (e.g., at the shelf 804). In some embodiments, the attachment structure comprises one or more layers of pressure sensitive adhesive (PSA) or other attachment and sealing materials (e.g., glue, epoxy, tape, adhesive elastic/rubber, gasket, O-ring, etc.). Thus, the cover layer 800 can be bonded to adhered to the shelf 804 of the housing 102 by an adhesive or bonding agent such as PSA layers 818, 820 positioned on opposite sides of a substrate 822 that is part of the attachment structure 808 and that provides some rigidity to the attachment structure 808 for easier installation to the shelf 804. The trace layers 812, 816 can include a plurality of conductors (e.g., the representative sets of conductors shown as elements 110 and 824/826 in the figures) to sense a user instrument at the surface of, or in close proximity to the surface of, the cover layer 800.

The display interface 104 can have an active touch sensing region 828 in which the touchscreen touch sensor assembly 830 (i.e., 812, 814, 816) can detect a user object on or immediately over the outer surface of the cover layer 800. This active touch sensing region 828 can also coincide with the region through which information is presented to the user by the display assembly 810. The active touch sensing region 828 can coincide with the positioning of the first set of conductors 824 (i.e., conductive traces or electrodes) which extend in a first direction (i.e., as shown in FIG. 8, parallel to the plane of the page) and can coincide with the positioning of the second set of conductors 826 (i.e., conductive traces or electrodes) extending perpendicular to the first direction (i.e., as shown in FIG. 8, perpendicular to the plane of the page and penetrating the plane of the page). The insulator layer 814 separates the trace layers 812, 816 and ensures that a capacitance is measurable between the conductors 824, 826.

Figure 14:
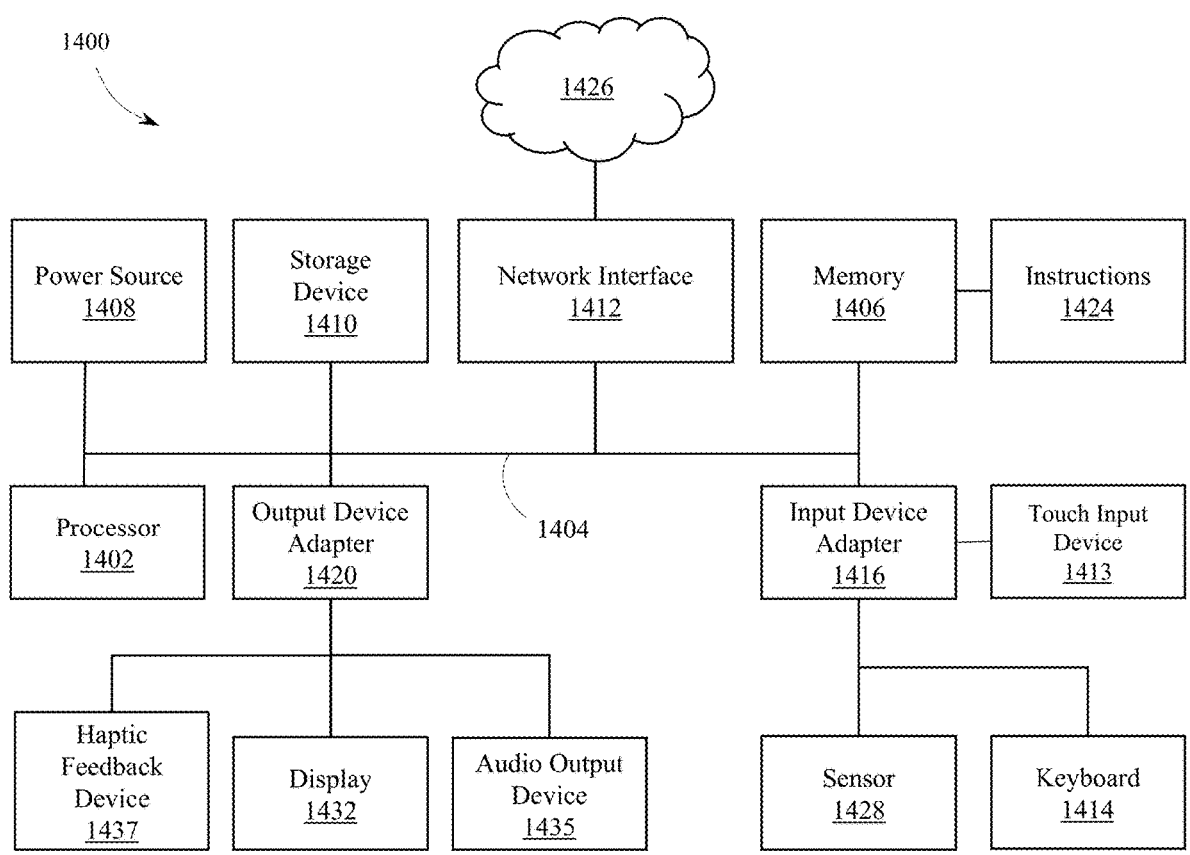
FIG. 14 shows a schematic chart of a computing device that can be implemented as parts of various embodiments of the present disclosure.

In FIG. 8, the object sensor can comprise a set of conductors arranged in a spaced apart manner, such as by being positioned on opposite sides of the substrate 822 in the attachment structure 808. The conductors can include a sensor conductor 850 and a shield conductor 852, with the sensor conductor 850 positioned nearer to the outer surface of the cover layer 800 than the shield conductor 852. Thus, the sensor conductor 850 can be positioned on an outer side of the substrate 822, and the shield conductor 852 can be positioned on an inner side of the substrate 822 (i.e., forming a capacitor) without coming into electrical communication with each other. As used herein, parts in "electrical communication" with each other are configured to exchange electrical signals, directly or indirectly, between each other, whether unidirectionally or bidirectionally. An object sensor (e.g., 202) can be said to be in electrical communication with a processor or controller device if the processor or controller device is using signals generated by the object sensor or if the processor or controller device is using signals reliant upon or derived at least in part on the signals generated by the object sensor. For example, the object sensor can be in electrical communication with a processor via an input device adapter (i.e., a touch controller board or similar component) and an electrical communications bus, as indicated in FIG. 14 and described in further detail below.

When the conductors 850, 852 are energized or charged, a capacitance can be measured between them, and that capacitance can change in response to introduction of a user object within a detection zone surrounding the conductors 850, 852. The sensor conductor 850 can alternatively be referred to as a sensor electrode or driven sensor, and the shield conductor 852 can be referred to as a driven shield or shield electrode. At least one of the conductors 850, 852 can be electrically driven or charged to sense the user object. The sensor conductor 850 and shield conductor 852 can, in some embodiments, extend around the entire length of the attachment structure 808 and can be joined to a connector that provides electrical communication between the conductors and a control device (e.g., 106).

Figure 11:
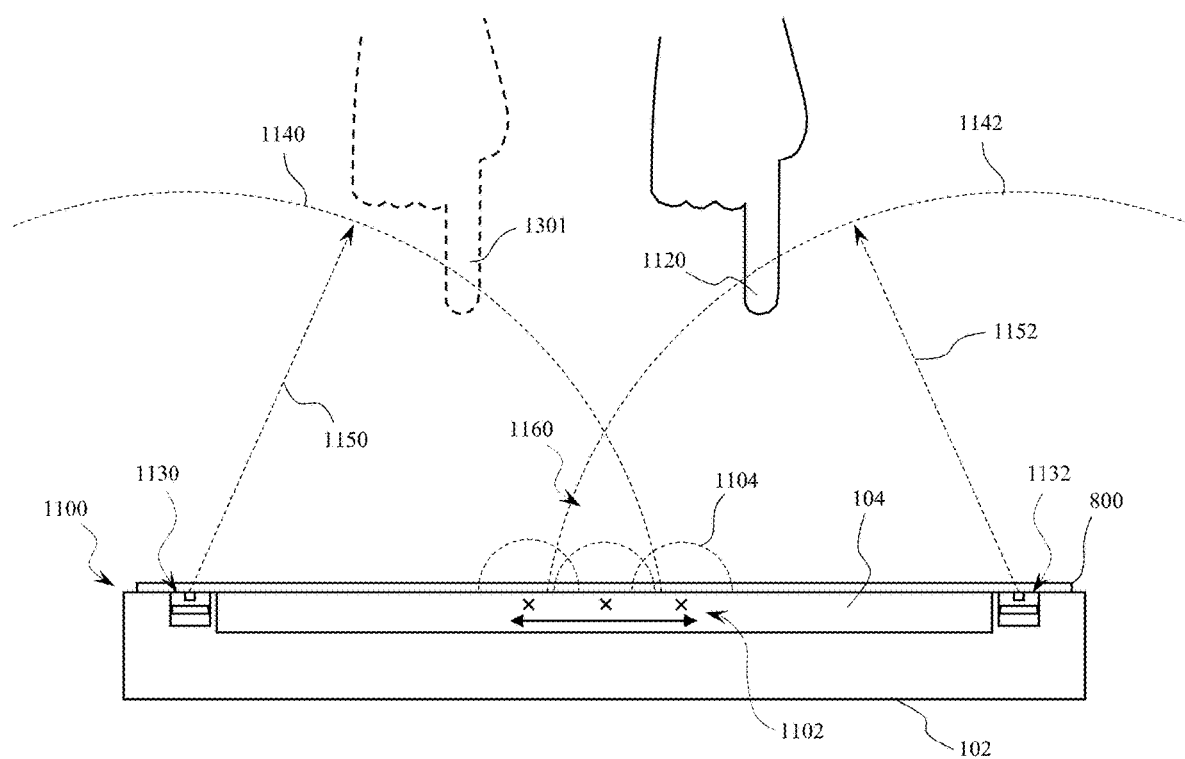
FIG. 11 shows a schematic side view of an electronic device with indicated object detection ranges for various example sensors.

As shown in the cross-section of FIG. 8, the sensor conductor 850 and the shield conductor 852 can have different lateral widths, and the shield conductor 852 can have a greater lateral width than the sensor conductor 850. This configuration can improve sensitivity of the object sensor by reducing the effect of parasitic capacitance to ground (i.e., the parasitic capacitance to the nearby outer enclosure 802 or other conductive components in the electronic device 100). Without a shield conductor 852, a large ground parasitic capacitance (e.g., greater than 100 picofarads) can limit the detection range at which a user object is distinguishable over noise or error in the measurement of the capacitance of the sensor. However, by including the shield conductor 852, and particularly a driven shield, parasitic ground capacitance is diminished or eliminated, as will be understood by those having ordinary skill in the art and having the benefit of the present disclosure. In effect, the shapes, positioning, and excitement/driven status configuration of the conductors 850, 852 can shape the flux 860 of the sensor conductor 850 and shield conductor 852. The shape of the flux 860 (schematically shown in FIG. 8 and having an effective detection range as indicated in FIG. 11) can be primarily directed away from the shelf 804 so as to project outward through the cover layer 800 and laterally away from the front/outer surface 854 of the cover layer 800 (i.e., over and beyond the edge 856 of the housing 102). The flux shaping can beneficially enable longer effective capacitance sensing range relative to the conductors 824, 826 of the display interface 104.

Figure 9:
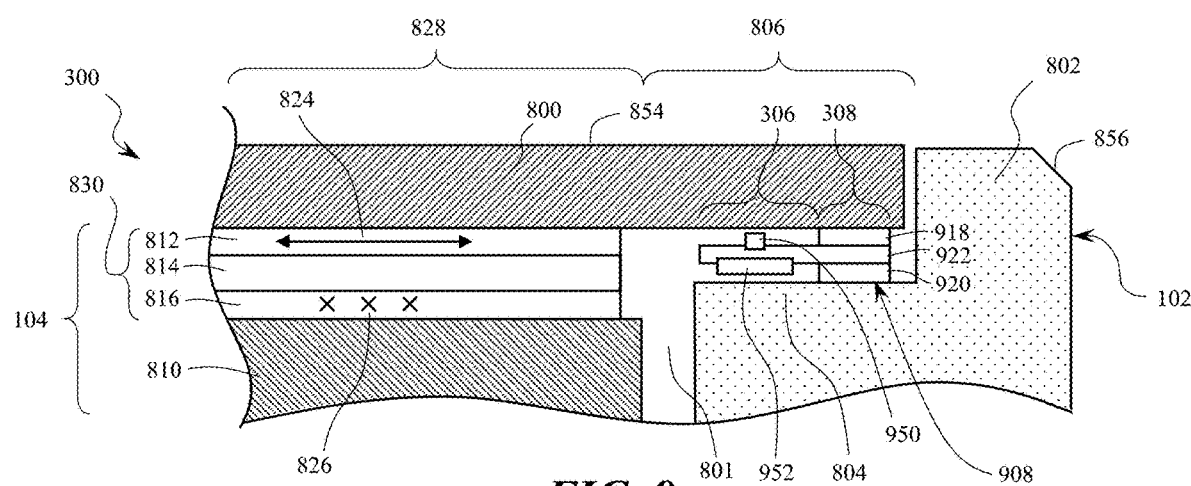
FIG. 9 shows a side section view as taken through section lines 9-9 in FIG. 3.

FIG. 9 shows a side section view of electronic device 300 as taken through section lines 9-9 in FIG. 3. In this embodiment, the attachment structure 908 includes a radially inner-positioned first portion 306 and a radially outer-positioned second portion 308 as also indicated in FIG. 3. The PSA layers 918, 920 only extend across the lateral width of the second portion 308 in contact with the substrate 922. The sensor conductor 950 and shield conductor 952 are positioned in the first portion 306 independent from the PSA layers 918, 920 but positioned on the substrate 922. In some embodiments, one or more of the PSA layers 918, 920 can be separate from the substrate 922, and the substrate 922 can be mounted to the cover layer 800 or shelf 804 independent of the PSA layer joining the cover layer 800 to the shelf 804.

The conductors 950, 952 can be spaced out of contact with the cover layer 800 and out of contact with the shelf 804 or other portions of the outer enclosure 802. This configuration can be beneficial to avoid damage to the substrate or conductors when the attachment structure 908 is assembled to the housing 102 and cover layer and can limit pressure applied to the conductors 950, 952 as compared to when the conductors are covered by PSA and compressed between the cover layer 800 and shelf 804. Exposing the conductors 950, 952 can also limit electrical interference or parasitic effects of the PSA or other connecting structure, as compared to the embodiment of FIG. 8, thereby potentially improving range and signal clarity of the object sensor. The configurations of the conductors 850, 852, 950, 952 in FIGS. 8 and 9 provide spacing between the conductors 824, 826 of the assembly of the display interface 104 and the object sensor, thereby reducing signal interference or parasitic effects caused by the display interface 104 or object sensor on each other.

Figure 10:
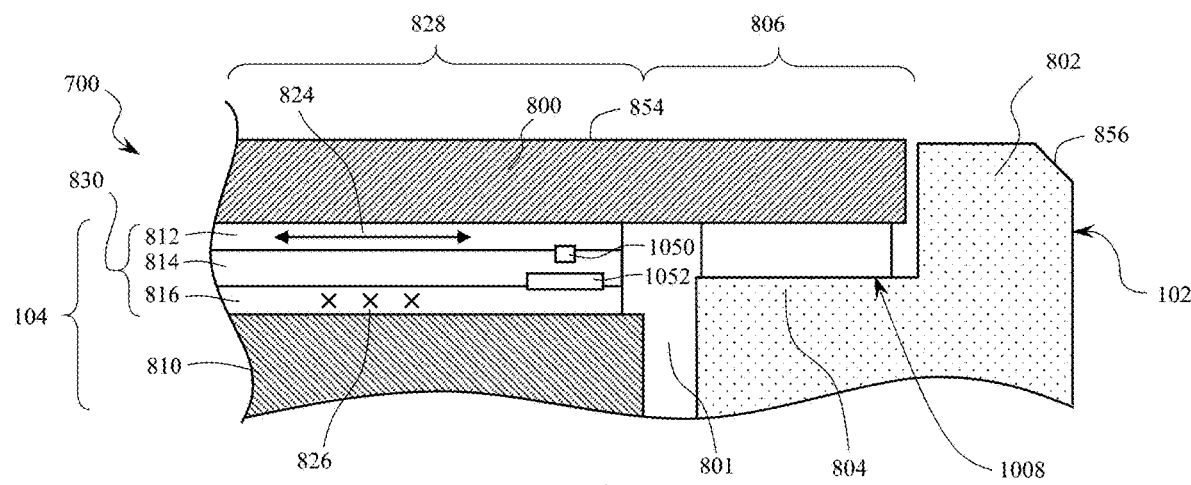
FIG. 10 shows a side section view as taken through section lines 10-10 in FIG. 7.

FIG. 10 shows a side section view of electronic device 700 as taken through section lines 10-10 in FIG. 7. In this embodiment, the attachment structure 1008 does not contain portions of the object sensor and can be used for simple attachment between the cover layer 800 and the outer enclosure 802. As indicated in FIG. 7, the object sensor(s) can instead be embedded within (or, in some embodiments, layered above or below) at least one of the layers of the touch sensor assembly 830 within the touch sensing region 828 or within the perimeter of the display interface 104.

As shown in FIG. 10, an object sensor can have a sensor conductor 1050 positioned on or embedded in an upper/outer/front side of an insulator layer 814 and can have a shield conductor 1052 positioned on or embedded in a lower/inner/rear side of the insulator layer 814. In some embodiments, a circuit board/flex (similar to substrate 822) that is separate or at least different from the insulator layer 814 can be embedded between the conductors 1050, 1052 in place of the insulator layer 814. This can, in some cases, make construction easier for the touch sensor assembly 830 or can improve the flux shaping characteristics of the conductors. Additionally, in some embodiments the sensor conductor 1050 and shield conductor 1052 can comprise copper or other conductive traces routed around (i.e., internally or externally adjacent to) the perimeter of the touch sensor assembly 830, and the sensor conductor 1050 and shield conductor 1052 are not formed as or on a separate layer from the trace layers 812, 814. The conductors 1050, 1052 can be positioned within the lateral perimeter of the display interface 104 and can be positioned in the layers of the touch sensor assembly 830 in a manner avoiding significant overlapping or contact with the conductors 824, 826 positioned elsewhere in the touch sensor assembly 830, thereby avoiding shorts and minimizing parasitic effects of those electrodes and other conductive components in the display interface 104. For example, the conductors 1050, 1052 can be positioned in gaps or spaces between the touch sensor conductors 824, 826 that extend across substantially the entire width of the display interface 104 (and of which only some representative conductors 824, 826 are shown in FIGS. 8-10). The additional spacing of the conductors 1050, 1052 laterally internally away from the shelf 804 within cavity 801 can also reduce parasitic capacitance effects of the outer enclosure 802. This configuration can also help minimize the overall touch sensor perimeter/area and minimize the size of the device bezel and housing.

FIG. 11 is a schematic side view of an electronic device 1100 such as electronic device 200, 300, 400, 500, or 600. Principles discussed in connection with FIG. 11 can also be applied to the embodiment of FIG. 7, as will be understood by those having the benefit of the present disclosure. A housing 102, including a cover glass or cover layer 800, encloses a display interface 104 having a capacitive touch sensor array 1102. The array of electrodes of the capacitive touch sensor array 1102 can define a set of effective user object ranges 1104 (i.e., object detection zones or object detection fields) substantially centered at each of the overlapping intersection points of the electrodes (i.e., each centered where an upper electrode overlaps with a lower electrode). In FIG. 11, only a small number of ranges 1104 are shown, but the ranges 1104 (and associated electrodes in the array 1102) can extend across the entire width of the display interface 104.

The object detection ranges 1104 of the display interface 104 can be small, such as by having effective sensing range radii of 2 millimeters or less, beyond which the electric field emitted by an expected user object would not be distinguishable from noise or sensor variation/error. A touch from the user object (e.g., 1120) on the cover layer 800 can be detected by the electronic device 1100 when the user object is contacting or nearly contacting the cover layer 800 (e.g., the user object is at a distance of less than 2 millimeters from the sensor array 1102). When the user object is within an object detection range 1104, the electric field output by the user object influences the capacitance measurable between certain electrodes associated with that particular object detection range 1104 while substantially not affecting the capacitance measurable between electrodes associated with other object detection ranges 1104 across the display interface 104 (i.e., the effect of the user object on those capacitances can be essentially indistinguishable from sensor noise/inherent variation). Thus, the position and movement of one or more user objects on the display interface 104 can be tracked as the user object moves from one detection range 1104 to another. Detection ranges 1104 can at least partially overlap each other to eliminate dead zones in which the user object is not found (or is not detected with a sufficient minimum confidence level) by the capacitive touch sensor array 1102.

The electronic device 1100 also includes at least one object sensor 1130, 1132. The object sensors 1130, 1132 in FIG. 11 represent object sensors or portions of the object sensors described in FIGS. 2-10. The object sensors 1130, 1132 can be capacitance sensors (e.g., sensors having the electrodes 850/852, 950/952, 1050/1052), infrared sensors (e.g., PIR devices), cameras, ambient light sensors, similar devices, and combinations thereof. The object sensors 1130, 1132 can be separate, independent sensors (e.g., as in electronic device 500) or can be parts of a single object sensor (e.g., as in electronic device 200). The object sensors 1130, 1132 can each have effective detection ranges 1140, 1142 (i.e., detection fields or zones) that represent the zones in which the user object (e.g., 1120) is detectable/distinguishable from noise or sensor variation/error by their respective object sensors 1130, 1132. As suggested by FIG. 11, the detection ranges 1140, 1142 of the object sensors 1130, 1132 can have comparatively greater sensor range radii 1150, 1152 than the sensor range radii of the object detection ranges 1104 defined by the display interface 104.

At least when an object sensor 1130, 1132 is a capacitive sensor, its detection range can extend further away from the cover layer 800 than the display interface 104 detection zones or ranges due to the physical and electrical characteristics of the object sensor electrodes or conductors (e.g., size, shape, positioning, current, voltage, etc.). Some example characteristics are discussed in connection with the sensor conductors and shield conductors described above in connection with FIGS. 8-10. The capacitance-sensitive object sensor 1130, 1132 can be more sensitive to the electric field of the user object at a distance than the display interface 104 and can therefore produce a signal that can be distinguished from noise or other natural variation in the signal produced by the sensor 1130, 1132 when the user object is in detection ranges 1140, 1442 further away from the device 1100 as compared to ranges 1104. Accordingly, the object sensors 1130, 1132 can define user object sensing zones that overlap with, but are larger than, the user object detection zones of the display interface 104.

In some embodiments, the detection ranges 1140, 1142 of two different object sensors can overlap each other, as shown, for example, within overlapping detection zone 1160. Thus, the object sensors 1130, 1132 can both produce a detection signal when the user object moves into the overlapping detection zone 1160. In some embodiments, the signal produced by each object sensor is different, and, based on those differences, the position of the user object relative to the object sensors 1130, 1132 can be determined (or at least estimated), as will be understood by those having skill in the art and the benefit of the present disclosure. Thus, based on the size and positioning of overlapping detection zones (e.g., 1160), the object sensors 1130, 1132 can be used to track or detect the position or movement of at least one user object 1120 relative to the electronic device 1100. This can also allow the electronic device 1100 to use the object sensors to sense gestures or similar movements of the user object so that the user object can provide input to the device without being within the sensing ranges 1104 of the display interface 104. See also FIG. 13. In some embodiments, the overlapping detection zone 1160 can extend across all or a majority of the distance between the object sensors 1130, 1132, such as by extending across the entire width dimension of the display interface 104 between the object sensors.

In some embodiments, the object sensors 1130, 1132 can include other proximity-sensing devices. When an object sensor includes an infrared/PIR sensor, a lens (e.g., Fresnel or similar lens) can be used to improve the size and shape of the detection range 1140 associated with the sensor. In some embodiments, object sensors 1130, 1132 can be hidden in the electronic device 1100, such as by being positioned below a painted or otherwise opaque cover layer 800.

Figure 12:
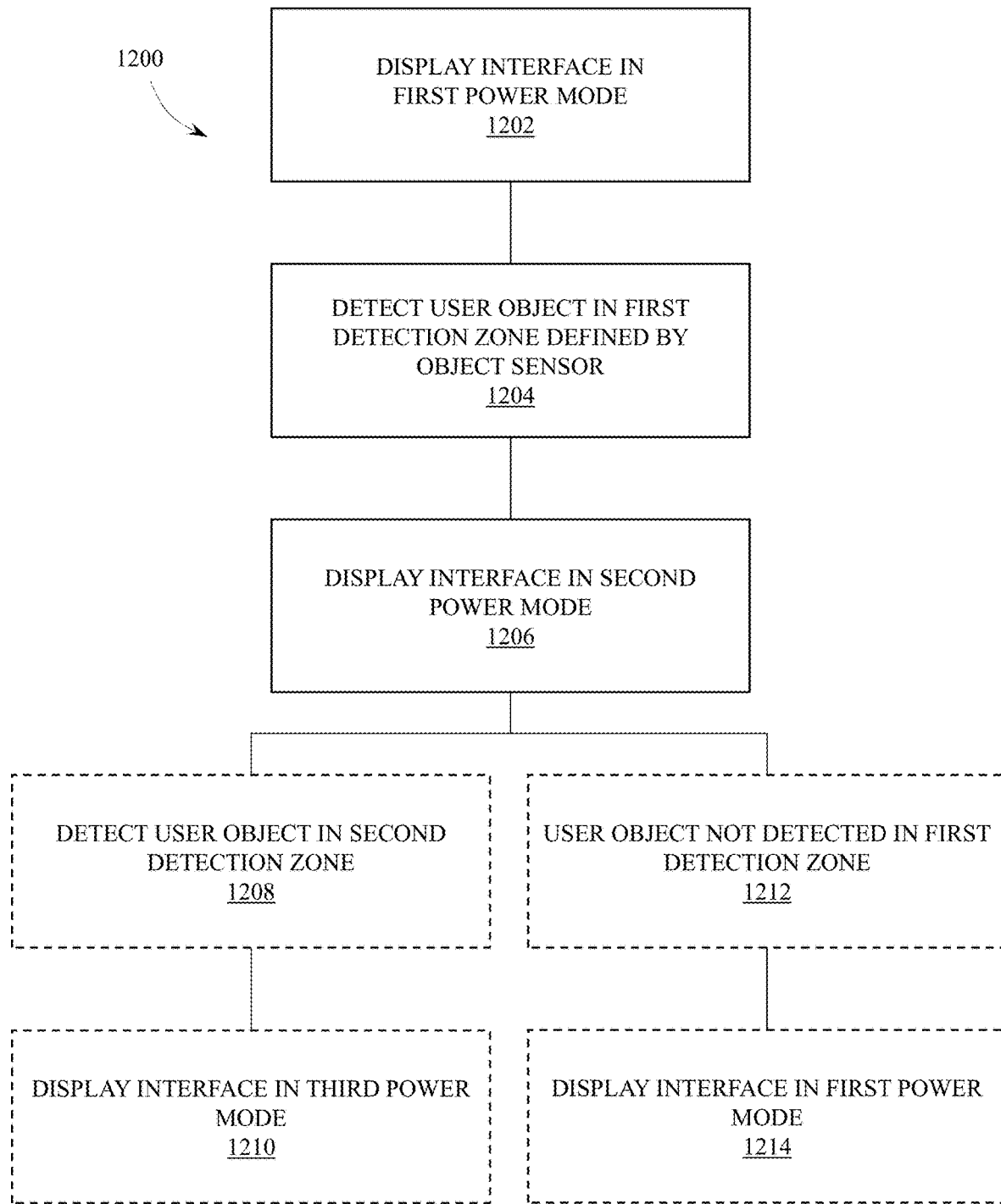
FIG. 12 shows a chart of a process of the present disclosure.

FIG. 12 shows a process 1200 for controlling components of an electronic device (e.g., any of the electronic devices described in connection with FIGS. 1-11). The process 1200 can be executed by computing components (e.g., computing components described in connection with FIG. 14). In block 1202, the process 1200 can include configuring a display interface (e.g., any of the display interfaces described in connection with FIGS. 1-11) in a first power mode. When in the first power mode, the display interface, including both its touch sensor assembly and its output/display screen components, can have a first responsiveness characteristic or sensitivity characteristic, such as by being disabled or placed in a very low power consumption state (e.g., a low user touch scan frequency such as one scan per second or less). As used herein, a "responsiveness characteristic" refers to a characteristic affecting the latency, response time, or reaction time of a touch-sensing interface. Thus, in some embodiments, improving a responsiveness characteristic can include increasing a scan rate or increasing a sensing range (e.g., via increasing power to electrodes) in a touch-sensing interface. As used herein, a "sensitivity characteristic" refers to a characteristic affecting the likelihood of a touch being detected by a touch-sensing interface. Thus, in some embodiments, improving a sensitivity characteristic can include lowering a scan rate to give a touch sensor more time to measure a signal. The display interface can appear to be off/unlighted, and, if completely disabled, can be prevented from detecting a user object (i.e., prevented from sensing a change in electric field due to the presence of a user object), or, if in a very low power consumption state, can be delayed in responding to a user touch on the display interface (i.e., wakes after the user touches for up to one second or longer rather than just making a relatively instantaneous-duration touch). In this state, the electronic device can be highly conservative of energy drawn from an onboard energy source (e.g., a battery or similar source) since it does not need to keep a backlight, LCD, or touch traces active and prepared for interaction with a user.

While the display interface is in this first power mode, an additional object sensor (e.g., any of the object sensors described in connection with the previous figures) can be enabled for detection of a user object (i.e., energized and producing signals indicative of the presence, absence, or movement of a user object in a sensing or detection zone around the sensor). The object sensors, when active in this manner, can have lower power consumption than an active display interface, including lower power consumption than the display interface even when only the touch sensor assembly of the display interface is actively scanning for and awaiting a user touch. Thus, although power is still consumed by the object sensors, the higher consumption of the display interface is not required. Accordingly, the electronic device can stay in this suspended or sleep state for a more extended period of time before energy source depletion as compared to when the display interface is consistently scanning for a user object.

As shown in block 1204, the process 1200 can further include detecting a user object in a first detection zone defined by the object sensor. As explained elsewhere herein, this can include detecting that the user object has entered a zone detectable by the object sensor (e.g., object is in detection range 1140, 1142, or both), and an object sensor therefore outputs a signal to a control device indicative of the presence of a user object. For example, a user's body part can move within sensing range of an object sensor of the electronic device at a distance that also is beyond and outside the sensing range of the display interface, such as by the user moving his or her finger into the object sensor's range without yet touching the cover layer of the electronic device at the display interface. The control device can therefore be alerted to the presence of what could be an incoming user interaction with the display interface.

As shown in block 1206, the process 1200 can include responding to the detection of the user object in block 1204 by configuring the display interface in a second power mode (i.e., a mode having a second responsiveness characteristic that is increased relative to the first responsiveness characteristic). In some embodiments, the second power mode can include a configuration where the touch sensor assembly and the display output assembly of the display interface are both activated, such as by turning on the backlight, LCD, and capacitive touch electrodes so that the user can immediately see and interact with the display interface. In some embodiments, the second power mode can include a configuration where the touch sensor assembly is activated for moderate-to high-frequency user touch scanning while the display output assembly of the display interface remains disabled. Thus, in this second power mode, the display interface can be a heightened, more responsive state of detection as compared to the first power mode, and the display interface can draw more power than in the first power mode.

If the user object stops being detected by the object sensor(s) or if there is a timeout (e.g., the user object remains detected for too long, potentially indicating a false positive), the display interface can transition back to the first power mode of block 1202 to conserve power and the process can reset from block 1202.

As indicated in optional block 1208, when the display interface is in the second power mode of block 1206, the process 1200 can further include detecting a user object in a second detection zone, such as at the surface of the display interface or cover layer on the display interface. The user object can be detected in this position by the object sensor(s) and/or by the touch sensor assembly of the display interface. In some embodiments, this can comprise detecting that the user object is touching the cover layer or display interface.

As indicated in optional block 1210, the display interface can be configured in a third power mode. This transition to the third power mode can be done in response to detecting the user object in accordance with block 1208. The third power mode can include a fully "awakened" and active mode in which both the touch sensor assembly and the display output assembly are active, so the display interface is fully enabled for sensing the user object(s) at various positions and for providing visual information to a user. The display interface can be used in this third power mode until reset to the first power mode (e.g., by the user pressing a power or standby button on the device that turns off the display). Accordingly, the electronic device can be controlled to minimize energy consumption based on the presence and activities of the user, thereby extending the life and useful duration of its energy storage system.

In some embodiments, the process 1200 can include an optional block 1212, wherein the user object is not detected in the first object detection zone although the display interface is in the second power mode (as indicated in block 1206). For example, the user object may have moved away from the electronic device after passing through the first detection zone and without coming into contact with the electronic device or without entering the second detection zone (e.g., without being detected as shown in block 1208). In another example, the user object may not be detected because the object sensor experiences a condition in which the user object may still be positioned within the first detection zone, but the user object is still not detected because of other factors such as interference from other objects or fields in the first detection zone. For instance, a user object (e.g., finger) can be detected in connection with block 1204, and although the user object remains in the first detection zone when block 1212 is executed, an interference object or field may also be introduced to the first detection zone (e.g., the rest of the user's hand, palm, leg, etc. or the object sensor is simultaneously placed near another strong electric field) that makes the certainty of the detection of the user object fall below a desired confidence value (i.e., the user object is "not detected" with sufficient confidence to differentiate the user object's presence from other environmental objects or conditions). In one example embodiment, the object sensor can detect a condition wherein a user object's electric field blends into or is significantly smaller than the electric field of one or more other objects near the object sensor. In another example, the object sensor can detect a condition wherein the detected electric field has a strength or other electrical properties that exceeds a typical threshold for an expected or anticipated type of user object, such as an electric field having a strength that exceeds the electric field capable of being output by a human finger or thumb, thereby suggesting to the controller that the thing being detected in the first detection zone is not a qualifying user object intended for interaction with the display interface or is something that could potentially cause damage to the electronic device.

The process 1200 can then include transitioning the display interface to the first power mode, as indicated in block 1214. This transition can be done because the lack of user object detection in block 1212 typically indicates that a user is no longer going to have imminent interaction with the electronic device, at least at the display interface, so there is no imminent need to keep the display interface in a higher consumption mode (i.e., the second power mode of block 1206). Thus, the controller can change the power consumption mode from a higher consumption state with a higher frequency touch scan rate to a lower consumption state with a lower frequency (or no) touch scan rate in block 1214.

Figure 13:
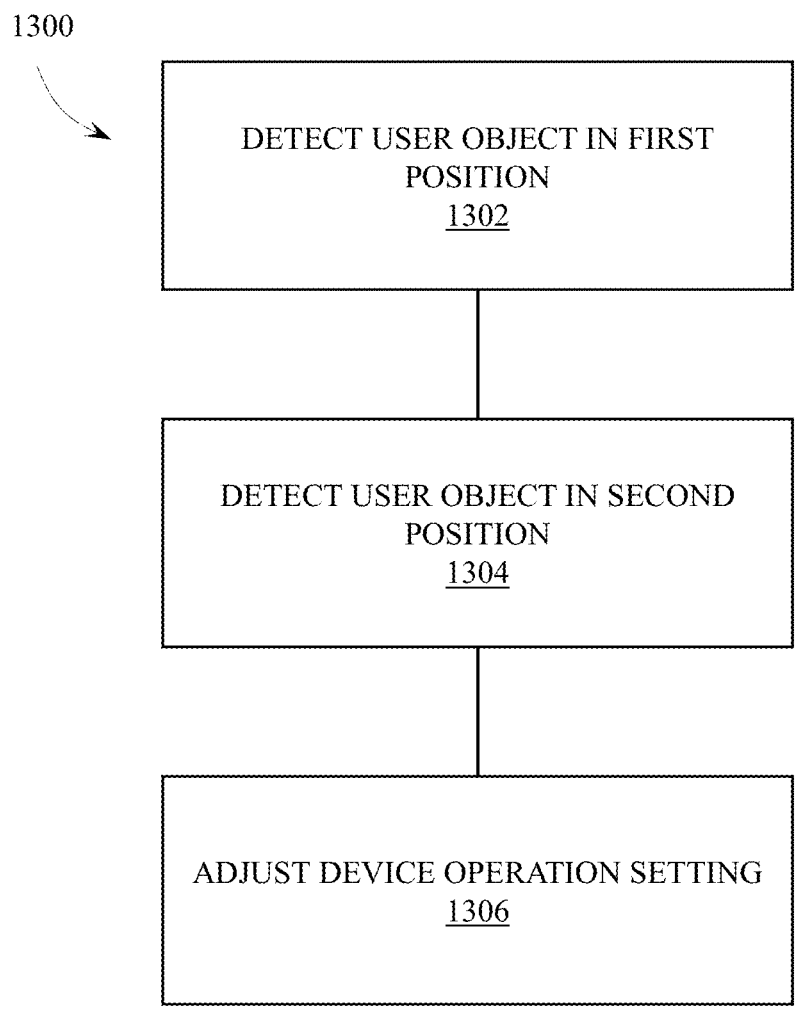
FIG. 13 shows a chart of a process of the present disclosure.

FIG. 13 is a chart illustrating a process 1300 for controlling components of an electronic device (e.g., any of the electronic devices described in connection with FIGS. 1-11). The process 1200 can be executed by computing components (e.g., computing components described in connection with FIG. 14). In block 1302, the process 1300 can include detecting a user object in a first position (e.g., as shown by user object 1120 in FIG. 11). The object sensor (e.g., object sensor 1132) can detect the user object within its detection range (e.g., 1142) via its capacitance-sensing capabilities. In block 1304, the process 1300 can include detecting the user object in a second position (e.g., as shown by user object 1301 in FIG. 11). The same object sensor (e.g., 1132, if the user object is still within range 1142) or a different object sensor (e.g., 1130, if the user object is within range 1140) can be used for this detection. If the same object sensor is used for both detections, the different positions can be determined based on a comparison of signal strengths or other physical/electrical characteristics of the object. If a different object sensor is used, the different positions can be determined based on which object sensor detects the object at each time and/or the signal strengths or other physical/electrical characteristics of the object.

In either case, the process 1300 can further include adjusting a device operation setting in block 1306. The device operation setting can be a setting for the electronic device or for a component thereof (e.g., the display interface), such as a power setting (e.g., transitioning from the first power mode to the second or third power mode, or vice versa) or an application or system setting. For example, adjusting a setting can include changing volume of audio output of the electronic device, changing brightness of the display interface, providing input to a user application running on the electronic device (e.g., pausing or playing a song), providing system information via an output device (e.g., showing notifications, battery charge level, time, etc. on the display interface), similar actions, or combinations thereof.

FIG. 14 shows a high-level block diagram of a computer system 1400 (i.e., a controller system or processing system) that can be used to implement embodiments of the present disclosure. In various embodiments, the computer system 1400 can comprise various sets and subsets of the components shown in FIG. 14. Thus, FIG. 14 shows a variety of components that can be included in various combinations and subsets based on the operations and functions performed by the system 1400 in different embodiments. For example, the computer system 1400 can be part of the electronic devices 100, 200, 300, 400, 500, 600, 700, and 1100 described above or the control or processing devices used to implement processes 1200 and 1300. It is noted that, when described or recited herein, the use of the articles such as "a" or "an" is not considered to be limiting to only one, but instead is intended to mean one or more unless otherwise specifically noted herein.

The computer system 1400 can comprise a central processing unit (CPU) or processor 1402 connected via a bus 1404 for electrical communication to a memory device 1406, a power source 1408, an electronic storage device 1410, a network interface 1412, an input device adapter 1416, and an output device adapter 1420. For example, one or more of these components can be connected to each other via a substrate (e.g., a printed circuit board or other substrate) supporting the bus 1404 and other electrical connectors providing electrical communication between the components. The bus 1404 can comprise a communication mechanism for communicating information between parts of the system 1400.

The processor 1402 can be a microprocessor or similar device configured to receive and execute a set of instructions 1424 stored by the memory 1406. The memory 1406 can be referred to as main memory, such as random access memory (RAM) or another dynamic electronic storage device for storing information and instructions to be executed by the processor 1402. The memory 1406 can also be used for storing temporary variables or other intermediate information during execution of instructions executed by the processor 1402. The processor 1402 can include one or more processors or controllers, such as, for example, a CPU for the electronic device in general and a touch controller or similar sensor or I/O interface used for controlling and receiving signals from the display interface 104 and any other sensors being used (e.g., 104, 202, 302, 402, 404, 406, 408, 502, 504, 602, 604, 702, 704, 706, 708, 1130, 1132). The power source 1408 can comprise a power supply capable of providing power to the processor 1402 and other components connected to the bus 1404, such as a connection to an electrical utility grid or a battery system.

The storage device 1410 can comprise read-only memory (ROM) or another type of static storage device coupled to the bus 1404 for storing static or long-term (i.e., non-dynamic) information and instructions for the processor 1402. For example, the storage device 1410 can comprise a magnetic or optical disk (e.g., hard disk drive (HDD)), solid state memory (e.g., a solid state disk (SSD)), or a comparable device.

The instructions 1424 can comprise information for executing processes and methods using components of the system 1400. Such processes and methods can include, for example, the methods described in connection with other embodiments elsewhere herein, including, for example, the methods and processes described in connection with FIGS. 12 and 13.

The network interface 1412 can comprise an adapter for connecting the system 1400 to an external device via a wired or wireless connection. For example, the network interface 1412 can provide a connection to a computer network 1426 such as a cellular network, the Internet, a local area network (LAN), a separate device capable of wireless communication with the network interface 1412, other external devices or network locations, and combinations thereof. In one example embodiment, the network interface 1412 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 1426 can be considered part of the system 1400. In some cases, a network device can be considered connected to, but not a part of, the system 1400.

The input device adapter 1416 can be configured to provide the system 1400 with connectivity to various input devices such as, for example, a touch input device 1413 (e.g., display interface 104), a keyboard 1414 or other peripheral input device, one or more sensors 1428 (e.g., 202, 302, 402, 404, 406, 408, 502, 504, 602, 604, 702, 704, 706, 708, 1130, 1132), related devices, and combinations thereof. In an example embodiment, the input device adapter 1416 is connected to the display interface 104 and conductors (e.g., 110, 824, 826) thereof to detect a position of touches or gestures on a cover layer (e.g., 800). In some configurations, the input device adapter 1416 can include the touch controller or similar interface controller described above. In some embodiments, the touch controller described above can include the input device adapter 1416 and the processor 1402 and other necessary components of the system 1400 for implementing a touch controller for a touch screen interface and object sensors described herein.

The sensors 1428 can be used to detect physical phenomena in the vicinity of the computer system 1400 (e.g., electric fields) and convert those phenomena to electrical signals. The keyboard 1414 or another input device (e.g., buttons or switches) can be used to provide user input such as input regarding the settings of the system 1400. In some embodiments, the input device adapter 1416 can be connected to a stylus or other input tool, whether by a wired connection or by a wireless connection (e.g., via the network interface 1412) to receive input via the touch input device 1413 and via the tool.

The output device adapter 1420 can be configured to provide the system 1400 with the ability to output information to a user, such as by providing visual output using one or more displays 1432, by providing audible output using one or more speakers 1435, or providing haptic feedback sensed by touch via one or more haptic feedback devices 1437. Other output devices can also be used. The processor 1402 can be configured to control the output device adapter 1420 to provide information to a user via the output devices connected to the adapter 1420. In some embodiments, the processor 1402 and/or output device adapter 1420 can be used to control power settings of the display 1432 and touch input device 1413 based on whether an object sensor (e.g., 1428) detects a user object or interacts with a display interface, as discussed in connection with other figures herein.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

As used herein, conjunctive terms (e.g., "and") and disjunctive terms (e.g., "or") should be read as being interchangeable (e.g., "and/or") whenever possible. Furthermore, in claims reciting a selection from a list of elements following the phrase "at least one of," usage of "and" (e.g., "at least one of A and B") requires at least one of each of the listed elements (i.e., at least one of A and at least one of B), and usage of "or" (e.g., "at least one of A or B") requires at least one of any individual listed element (i.e., at least one of A or at least one of B).

What is claimed is:

1. A computing device comprising:
a housing;
a capacitive touch-sensing assembly disposed within the housing and having an outer perimeter; and
a capacitive sensor disposed within the housing;
wherein the capacitive sensor is operable to sense an object independent of the capacitive touch-sensing assembly; and
wherein the capacitive sensor is disposed laterally external to the outer perimeter of the capacitive touch-sensing assembly.

2. The computing device of claim 1, wherein the capacitive sensor is disposed in a bezel area positioned between an outer lateral edge of the capacitive touch-sensing assembly and an outer lateral edge of the housing.

3. The computing device of claim 1, wherein the capacitive sensor is disposed adjacent and parallel to a relatively short side of the outer perimeter of the capacitive touch-sensing assembly.

4. The computing device of claim 1, wherein the capacitive sensor is configured to detect the object at a longer range than the capacitive touch-sensing assembly.

5. The computing device of claim 1, wherein the capacitive sensor is capable of detection of a user within a first detection zone with a larger sensing range than a second detection zone of the capacitive touch-sensing assembly.

6. The computing device of claim 1, wherein the capacitive sensor and a second capacitive sensor are disposed adjacent to at least two elongated sides of the outer perimeter of the capacitive touch-sensing assembly.

7. The computing device of claim 1, wherein the capacitive sensor and a second capacitive sensor are positioned adjacent to opposing edges of the outer perimeter of the capacitive touch-sensing assembly.

8. The computing device of claim 1, wherein the capacitive touch-sensing assembly is rectangular.

9. The computing device of claim 1, wherein the capacitive sensor surrounds the capacitive touch-sensing assembly.

10. The computing device of claim 1, wherein the capacitive sensor comprises a first portion bearing a set of electrodes and a second portion, radially offset from the first portion, bearing attachment structures joining the capacitive sensor to the housing.

11. An electronic device comprising:
a housing;
a processor;
a non-transitory computer-readable memory device in electronic communication with the processor;
a capacitive touch-sensing interface disposed within the housing, the capacitive touch-sensing interface having a perimeter, the perimeter having a length and a width, the capacitive touch-sensing interface being in electronic communication with the processor; and
a plurality of capacitive object sensors, each of the plurality of capacitive object sensors being disposed within the housing, in electronic communication with the processor, and disposed laterally external to at least one of:
the length of the perimeter of the capacitive touch-sensing interface; and
the width of the perimeter of the capacitive touch-sensing interface.

12. The electronic device of claim 11, wherein a first capacitive object sensor and a second capacitive object sensor of the plurality of capacitive object sensors are disposed adjacent to at least two elongated sides of the perimeter of the capacitive touch-sensing interface.

13. The electronic device of claim 12, wherein the first capacitive object sensor and the second capacitive object sensor are disposed on opposite sides of the capacitive touch-sensing interface relative to each other.

14. The electronic device of claim 11, wherein the plurality of capacitive object sensors is capable of detection of a user within a first detection zone with a larger sensing range than a second detection zone of the capacitive touch-sensing interface.

15. The electronic device of claim 14, wherein the non-transitory computer-readable memory device stores computer-executable instructions that, when executed by the processor, cause the processor to:
detect the user within the first detection zone; and
increase a responsiveness characteristic of the capacitive touch-sensing interface in response to detecting the user within the first detection zone, wherein the capacitive touch-sensing interface is enabled to detect the user within the second detection zone.

16. An electronic device comprising:
a housing comprising a housing external perimeter;
a touch screen interface disposed within the housing and comprising one or more trace layers; and
a first capacitive object sensor positioned laterally adjacent a perimeter edge of the one or more trace layers and located within the housing external perimeter, the first capacitive object sensor comprising:
a first conductor positioned on a first side of an insulator layer; and
a second conductor positioned on a second side of the insulator layer.

17. The electronic device of claim 16, wherein the first capacitive object sensor is positioned external to the perimeter edge of the one or more trace layers when the touch screen interface is viewed through a front surface of the touch screen interface.

18. The electronic device of claim 17, wherein the first capacitive object sensor is routed externally around the perimeter edge of the one or more trace layers.

19. The electronic device of claim 16, wherein the first capacitive object sensor is capable of detection of a user within a first detection zone with a larger sensing range than a second detection zone of the touch screen interface.

20. The electronic device of claim 19, further comprising a non-transitory computer-readable memory device in electronic communication with a processor and storing computer-executable instructions that, when executed by the processor, cause the processor to:
  detect the user within the first detection zone; and
  increase a responsiveness characteristic of the touch screen interface in response to detecting the user within the first detection zone, wherein the touch screen interface is enabled to detect the user within the second detection zone.

* * * * *